United States Patent
Oh et al.

(10) Patent No.: US 10,975,826 B2
(45) Date of Patent: Apr. 13, 2021

(54) METHOD FOR ENGINE START CONTROL BASED ON FAIL SAFE LOGIC AND A VEHICLE HAVING SAME

(71) Applicants: HYUNDAI MOTOR COMPANY, Seoul (KR); KIA MOTORS CORPORATION, Seoul (KR)

(72) Inventors: Chang-Jin Oh, Suwon-si (KR); Jung-Suk Han, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/213,436

(22) Filed: Dec. 7, 2018

(65) Prior Publication Data

US 2020/0040860 A1    Feb. 6, 2020

(30) Foreign Application Priority Data

Jul. 31, 2018  (KR) ........................ 10-2018-0089488

(51) Int. Cl.
  *F02D 41/22*  (2006.01)
  *F02N 11/10*  (2006.01)
  *F02D 41/06*  (2006.01)
  *F02N 11/08*  (2006.01)
  *F02D 41/30*  (2006.01)
  *F02P 5/04*  (2006.01)
  *F02P 5/145*  (2006.01)

(52) U.S. Cl.
  CPC ............ *F02N 11/10* (2013.01); *F02D 41/062* (2013.01); *F02D 41/3005* (2013.01); *F02N 11/08* (2013.01); *F02P 5/045* (2013.01); *F02P 5/145* (2013.01)

(58) Field of Classification Search
  CPC .... F02D 37/02; F02D 41/0097; F02D 41/062; F02D 41/3005; F02N 11/10; F02N 11/08; F02P 5/045; F02P 5/145
  See application file for complete search history.

(56) References Cited

U.S. PATENT DOCUMENTS 4,471,653 A * 9/1984 Kawamura ........... F02D 41/009
                                              123/612
6,718,960 B2 * 4/2004 Someno .................. F02D 37/02
                                              123/478

FOREIGN PATENT DOCUMENTS

| JP | 5312129 | 11/1993 |
| JP | 2017210942 | 11/2017 |
| KR | 100353993 | 9/2002 |
| KR | 100589625 | 6/2006 |
| KR | 100620267 | 9/2006 |
| KR | 101520946 | 5/2015 |

* cited by examiner

*Primary Examiner* — Gonzalo Laguarda
(74) *Attorney, Agent, or Firm* — Lempia Summerfield Katz LLC

(57) ABSTRACT

A method for engine start control based on a failsafe logic includes performing, by an engine control unit, calculated information failsafe control for performing miscalculation verification for a submodule start angle of a submodule using a start angle for fuel injection and ignition of an engine as a driver start angle of an injector driver.

8 Claims, 6 Drawing Sheets

METHOD FOR ENGINE START CONTROL BASED ON FAIL SAFE LOGIC AND A VEHICLE HAVING SAME

CROSS-REFERENCE TO RELATED APPLICATION

This application claims priority to and the benefit of Korean Patent Application No. 10-2018-0089488, filed on Jul. 31, 2018, which is incorporated herein by reference in its entirety.

BACKGROUND

Field of the Disclosure

Embodiments of the present disclosure relate to engine start control, and more particularly, to a vehicle capable of performing engine start control, in which usability of inaccurate data is blocked, based on failsafe logic with respect to a calculated information value.

Description of the Related Art

In general, an internal combustion engine of a vehicle operates under the control of fuel injection and ignition by an engine control unit.

The engine control unit includes a central processing unit and a submodule. In particular, the central processing unit controls fuel injection and ignition with respect to an engine. The submodule is composed of various function modules, which perform specific roles given for the control of the central processing unit, including a calculation module calculating a start angle of injection and ignition that is provided to the central processing unit.

As an example, the calculation module performs calculation of a start time using an end angle and an operation time transferred from the central processing unit (CPU). The central processing unit starts the fuel injection and ignition in consideration of the start angle of the calculation module at the start time simultaneously with transferring the end angle and the operation time to the calculation module. In this case, the start angle can be set using a timer module that is one of the function modules.

As described above, the engine control unit controls the fuel injection and ignition while performing mutual data exchange between the central processing unit and the submodule (i.e., calculation module) using as information the end/operation time and the start angle.

SUMMARY

However, for accuracy of the fuel injection and ignition control in the engine control unit, the start angle required from a specific submodule is calculated using a tooth period (i.e., time required for a rotation of one tooth) with respect to a crank tooth of a crankshaft.

As an example, in the start angle calculation procedure, the latest start angle for the start time of the injection and ignition is calculated from the tooth period up to a time before three crank teeth (i.e., an angle of 18 degrees). As start angle information transferred to the central processing unit, the last calculated angle at the time after the three crank teeth is confirmed as the final value of the start angle.

Accordingly, the submodule may cause miscalculation of the start time of the injection and ignition in the start angle calculation process. Even if the miscalculation occurs intermittently, the central processing unit uses the miscalculated start angle. Thus, the fuel injection and ignition that starts at an unintended time may cause a bad influence to be exerted on the optimized control of the engine.

Embodiments of the present disclosure overcome the above disadvantages and other disadvantages not described above. Embodiments of the present disclosure provide a method for engine start control based on a failsafe logic and provide a vehicle having same. Embodiments of the present disclosure cope with miscalculation occurrence of a submodule by verifying an information value for a fuel injection and ignition time provided by the submodule in a failsafe procedure in association with a central processing unit and the submodule. Embodiments of the present disclosure reduce unintended engine operability due to an excessive distortion of the start time of the fuel injection and ignition by not using the miscalculated information value at the fuel injection and ignition time through the failsafe. Embodiments of the present disclosure enable optimum engine control by observing intended fuel injection and ignition end time and operation time.

Other objects and advantages of the present disclosure can be understood by the following description and become apparent with reference to the embodiments of the present disclosure. Also, those having ordinary skill in the art to which the present disclosure pertains will appreciate that the objects and advantages of the present disclosure can be realized by the disclosed methods and vehicles as claimed, and combinations thereof.

In accordance with an embodiment of the present disclosure, a method for engine start control based on a failsafe logic includes a step of switching an engine control unit to an on state together with a key-on of an engine. The engine control unit includes an engine position management driver, an injector application, an igniter application, an injector driver, an igniter driver, and a submodule. The method includes an engine start information calculation control step of calculating, by the engine position management driver, a start angle of a fuel injection and ignition start time of the engine as a driver start angle by the injector driver and a submodule start angle by the submodule at any one of a key-on start time, a time excluding the start, and a fuel injection start time. The method includes a calculated information failsafe control step of verifying, by the injector driver, a miscalculation of the submodule start angle as the driver start angle. The method includes a fuel injection and ignition control step of applying, by the engine control unit, a verified value between the submodule start angle and the driver start angle to the fuel injection and ignition start time.

As an embodiment, the engine start information calculation control step includes performing, by the engine position management driver, driver sync confirmation and sync task with a crank signal and a cam signal of the engine. The engine start information calculation control step includes calculating, by the injector application and the igniter application, an ASW end angle and an ASW operation time for the fuel injection and ignition during performing of the sync task. The engine start information calculation control step includes confirming, by the injector driver and the igniter driver, the submodule start angle calculated by the submodule after calculating the driver start angle through the ASW end angle and the ASW operation time.

As an embodiment, in the engine start information calculation control step, the crank signal is tooth sensing information of a crank target wheel attached to a crankshaft, and the cam signal is edge sensing information of a cam target wheel attached to a cam shaft. The driver sync confirmation is performed at a position determination time of a piston in a cylinder of the engine, and the sync task performing is performed as many as the number of cylinders for one cycle of the engine.

As an embodiment, if the engine control unit is switched to the on state together with the key-on of the engine, the calculated information failsafe control step performs miscalculation verification with respect to the submodule start angle of the submodule in consideration of the start angle of the fuel injection and ignition start time of the engine as the driver start angle by the injector driver.

As an embodiment, the calculated information failsafe control step is divided into a failsafe control step during engine cranking and a failsafe control step after the engine cranking. The calculated information failsafe control step includes: performing the miscalculation verification with an error permission value of the submodule start angle for the driver start angle; completing the miscalculation verification through a crank tooth position passage determined at a time before a passage of three teeth; setting and storing in a register the start angle of the fuel injection and ignition start time; and performing an operation of the register in the fuel injection and ignition timing.

As an embodiment, the error permission value is applied as an error permission value during cranking in the failsafe control step during the engine cranking. The error permission value is applied as an error permission value during cranking in the failsafe control step after the engine cranking. The error permission value during the cranking is set to be larger than the error permission value during the cranking.

As an embodiment, the failsafe control step during the engine cranking is divided into confirming an error permission range for the submodule start angle by applying the error permission value during the cranking to the driver start angle, and setting any one of the submodule start angle and the driver start angle as the start angle for the fuel injection and ignition start time as the error permission range.

As an embodiment, in the failsafe control step during the engine cranking, the confirmation of the error permission range is performed where the submodule start angle is determined to be between a difference value obtained by subtracting the error permission value during the cranking from the driver start angle and a summed value obtained by adding the error permission value during the cranking to the driver start angle. If the error permission range is satisfied, the submodule start angle is applied. If the error permission range is not satisfied, a past submodule start angle that is a previous value of the submodule start angle is applied. The driver start angle is applied where the past submodule start angle also does not satisfy the error permission range. As the past submodule start angle, a latest value is selected from among a plurality of past submodule start angles that satisfy the error permission range.

As an embodiment, the failsafe control step, after the engine cranking, is divided into confirming an error permission range for the submodule start angle by applying the error permission value after the cranking to the driver start angle, and setting any one of the submodule start angle and the driver start angle as the start angle for the fuel injection and ignition start time as the error permission range.

As an embodiment, in the failsafe control step after the engine cranking, the confirmation of the error permission range is performed where the submodule start angle is determined to be between a difference value obtained by subtracting the error permission value after the cranking from the driver start angle and a summed value obtained by adding the error permission value after the cranking to the driver start angle. If the error permission range is satisfied, the submodule start angle is applied. If the error permission range is not satisfied, a past submodule start angle that is a previous value of the submodule start angle is applied. The driver start angle is applied where the past submodule start angle does not satisfy the error permission range. As the past submodule start angle, a latest value is selected from among a plurality of past submodule start angles that satisfy the error permission range.

In accordance with another embodiment of the present disclosure, a vehicle includes an engine control unit composed of an engine position management driver, an injector application, an igniter application, an injector driver, an igniter driver, and a submodule. The engine control unit is configured to calculate a driver start angle of the injector driver and a submodule start angle of the submodule, respectively, to perform miscalculation verification of the submodule start angle by applying an error permission value divided through cranking of an engine to the driver start angle, and to output a start angle for a fuel injection and ignition start time.

As an embodiment, the engine position management driver performs sync confirmation and sync task. The injector application and the igniter application calculate an end angle and an operation time for the fuel injection and ignition at a time of the sync task performing. The injector driver, the igniter driver, and the submodule receive the transferred end angle and operation time, respectively.

The engine start control applied to the vehicle according to the present disclosure implements the following operations and effects through the failsafe concept.

First, through the failsafe logic, the miscalculation application for the fuel injection and ignition start time is basically prevented. Second, excessive distortion of the fuel injection and ignition start time due to the miscalculation application is solved. Third, unintended engine operability according to the miscalculation application is reduced. Fourth, since intended fuel injection and ignition end time and operation time during control of the engine are maximally observed, engine optimization control becomes possible. Fifth, since the application software (ASW) and drivers constituting the engine control unit (ECU) observe the requirements according to the set logic, poor influence exerted on the engine control can be solved.

It is to be understood that both the foregoing general description and the following detailed description of the present disclosure are examples and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, an embodiment of the present disclosure is described in detail with reference to the accompanying drawings. However, since such an embodiment is an example and can be implemented in various different types by those of ordinary skill in the art to which the present disclosure pertains, the present disclosure is not limited to the embodiment described hereinafter.

Figure 1:
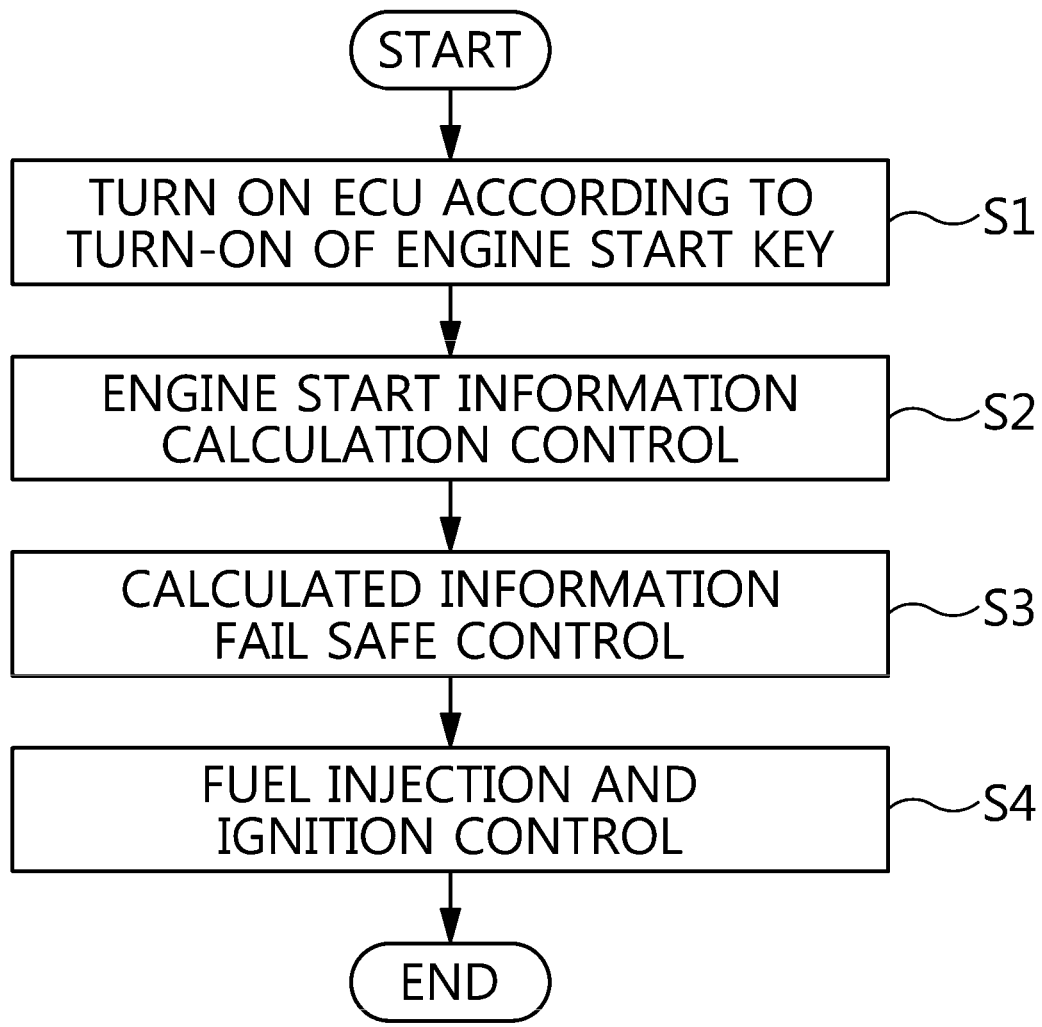
FIG. 1 is a flowchart illustrating a method for engine start control based on failsafe logic according to the present disclosure.

Referring to FIG. 1, a method for engine start control based on a failsafe logic includes an engine start information calculation control (S2). The engine start information calculation control is performed at a time when a sync task is performed after an engine sync in a state where an engine control unit is switched to an on state (S1) at any one of a key-on start time, a time excluding the start, and a fuel injection start time. The method also includes a calculated information failsafe control (S3) and a fuel injection and ignition control (S4).

In particular, the calculated information failsafe control (S3) is implemented by a failsafe logic. The failsafe logic includes receiving, by a driver of the engine control unit, a fuel injection and ignition start time provided by a submodule of the engine control unit. The failsafe logic also includes setting an error permission range subdivided in accordance with an engine situation using a start angle calculated by the driver itself. The failsafe logic also includes determining whether the start angle provided by the submodule is within the set error permission range and, if the start angle is within the set error permission range, setting a latest calculated value as the start angle.

Through this, the method for engine start control based on the failsafe logic prevents excessive distortion of the fuel injection and ignition start time due to the miscalculated start angle of the submodule constituting the engine control unit through the failsafe logic of the calculated information failsafe control (S30). In particular, the failsafe logic filters unconditional blind acceptance of the calculated value of the start angle of the submodule through self-calculation of the injector/igniter drivers constituting the engine control unit.

As a result, according to the method for engine start control based on the failsafe logic, since the engine control unit itself can verify the start angle miscalculation that may intermittently occur in the submodule, the fuel injection and ignition start phenomenon at an unintended time is prevented, which would otherwise exert a poor influence on the optimized control of the engine.

Figure 2:
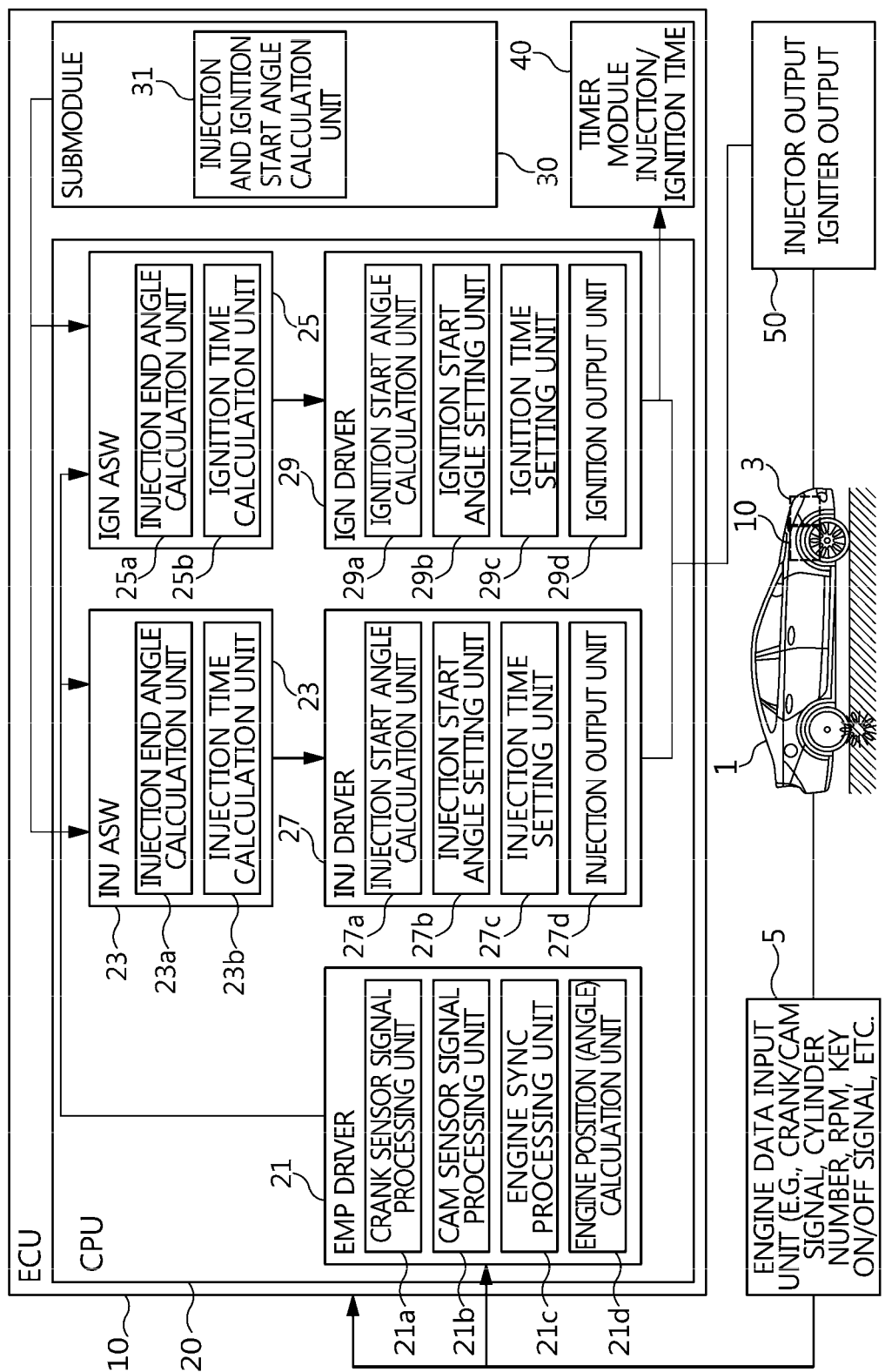
FIG. 2 is a diagram illustrating the configuration of a vehicle in which engine start control based on failsafe logic is implemented according to the present disclosure.

Referring to FIG. 2, a vehicle 1 includes an engine control unit 10 that controls an engine 3 while receiving an input of information of an engine data input unit 5.

Specifically, the engine 3 is an internal combustion engine. The engine data input unit 5 detects mount sensor information of the vehicle 1, including the engine 3, and transmits the detected information to the engine control unit 10. In this case, the mount sensor information includes a key on/off signal of the engine 3, a crank signal of a crank position sensor, a cam signal of a cam sensor, a cylinder number of the engine 3, an injector and igniter operation signal, and engine revolutions per minute.

Specifically, the engine control unit 10 operates software for controlling fuel injection and ignition, determines whether miscalculation has been performed with respect to a fuel injection and ignition start time, and performs failsafe logic for performing the fuel injection and ignition within a normal angle range. The engine control unit 10 includes a central processing unit 20 composed of an engine position management driver 21, injector application software 23, igniter application software 25, an injector driver 27, and an igniter driver 29. The engine control unit 10 also includes a submodule 30, a timer module 40, and a signal output unit 50.

As an example, the engine position management driver 21 performs a sync task for performing time synchronization with respect to sensing values through the tooth of a crank target wheel attached to a crankshaft and an edge of a cam target wheel attached to a cam shaft. The injector/igniter applications 23 and 25 calculate the end angle and the operation time of the injection and ignition and transfer the calculated end angle and operation time to the injector/igniter drivers 27 and 29. The injector/igniter drivers 27 and 29 transfer the angle and the time transferred from the injector/igniter applications 23 and 25 to the submodule 30. Further, the injector/igniter drivers 27 and 29 convert the operation time into an angle using an average value obtained by reading a plurality of tooth periods stored up to the corresponding time from the engine position management driver 21, and then calculate the start angle by subtracting the converted angle from the end angle. Further, the injector/igniter drivers 27 and 29 determine a difference between the start angle transferred from the submodule 30 and the self-calculated start angle as an error range. If the difference is within the error range, the injector/igniter drivers 27 and 29 use the value of the submodule 30. However, if the difference exceeds the error range, the injector/igniter drivers 27 and 29 set the self-calculated value in the timer module 40 and output the injection and ignition to match the time.

Accordingly, the engine position management driver 21 stores a plurality of tooth periods up to the corresponding time. The injector/igniter applications 23 and 25 perform calculation of the fuel injection and ignition operation time and end angle. The injector/igniter drivers 27 and 29 perform verification of the failsafe logic with respect to the calculation request for the start time and the calculated value of the start angle of the submodule.

Hereinafter, the detailed constituent elements and operations of the engine position management driver 21, the injector application 23, the igniter application 25, the injector driver 27, and the igniter driver 29 are described in detail.

Specifically, the submodule 30 calculates the fuel injection and ignition start time as the start angle based on the time required for one tooth to be rotated for each crank tooth up to the time before the converted angle of 18 degrees of three crank teeth form the calculated latest start angle. If the time of 18 degrees has passed, the submodule 30 confirms the last calculated angle as the final value of the start angle to transfer the confirmed last calculated angle to the injector/igniter drivers 27 and 29.

Specifically, the timer module 40 performs setting of the start time of the fuel injection and ignition start transferred from the injector/igniter drivers 27 and 29. The signal output unit 50 outputs a fuel injection and ignition start signal toward the engine 3 to match the set start time.

Hereinafter, the method for engine start control based on the failsafe logic of FIG. 1 is described in detail with reference to FIGS. 2 to 6. In this case, the control subject is the engine control unit 10. The control target is the engine 3 in which the injector's injection and the igniter's ignition are performed through the signal output unit 50 of the engine control unit 10.

The engine control unit 10 performs an engine control unit activation step (S1). Referring to FIG. 2, the engine control unit 10 receives from the engine data input unit 5 a key on/off signal of the engine 3, a crank signal of a crank position sensor, a cam signal of a cam sensor, a cylinder number of the engine 3, an injector and igniter operation signal, and engine revolutions per minute. Accordingly, the engine control unit 10 is switched and activated to be in an on state in association with a key-on signal of the engine 3.

The engine control unit 10 then enters into an engine start information calculation control step (S2). Referring to FIG. 2, the engine control unit 10 performs setting of the start time of the fuel injection and ignition start based on the crank signal and the cam signal with reference to the cylinder number, injector and igniter operation signals, and engine RPM among the information of the engine data input unit 5.

Figure 3:
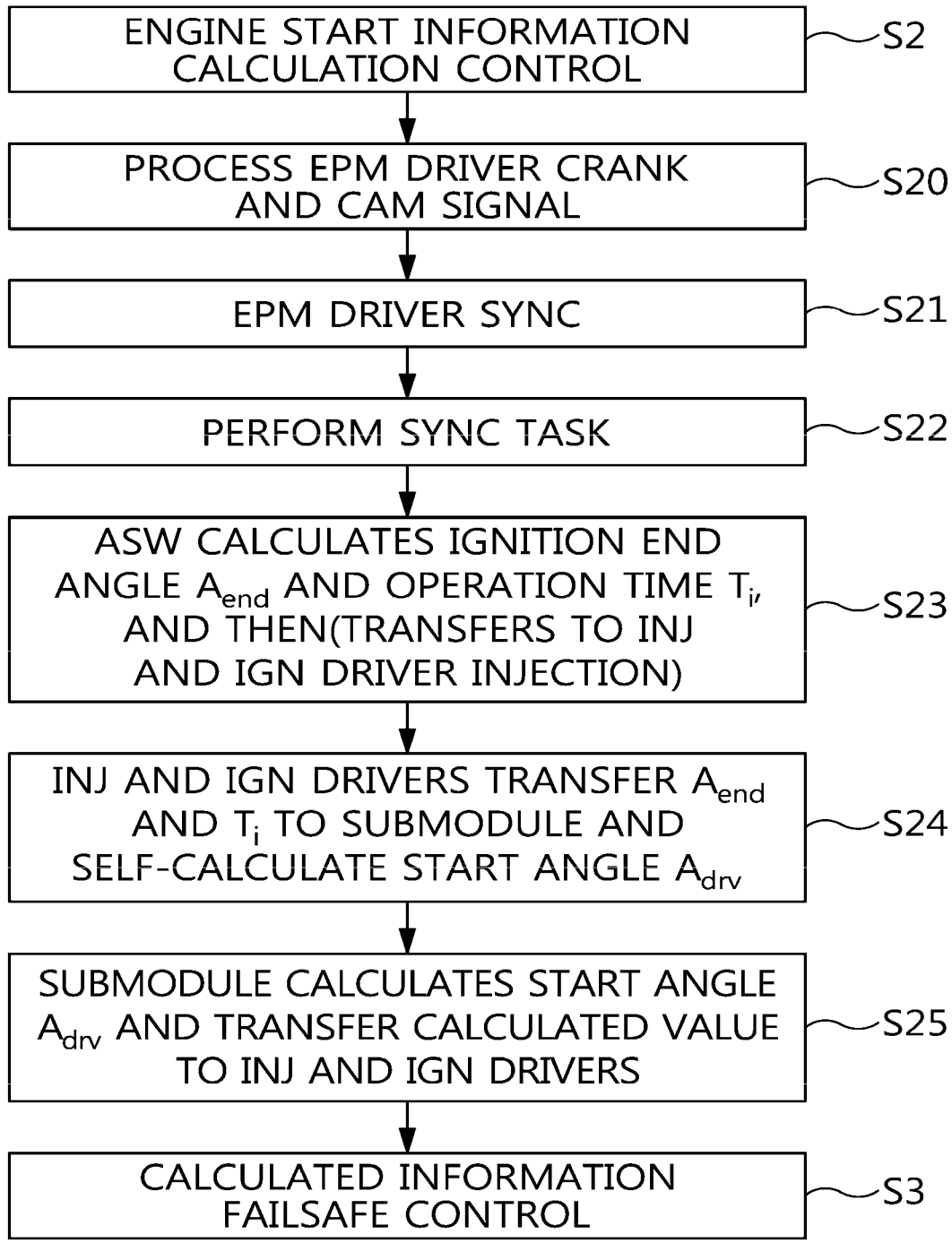
FIG. 3 is a flowchart illustrating engine start information calculation control for engine start control according to the present disclosure.

Specifically, as illustrated in FIG. 3, the engine control unit 10 dividedly performs the engine start information calculation control (S2) to set the start time of the fuel injection and ignition start.

Referring to FIG. 3, the engine start information calculation control (S2) is divided into a driver signal (e.g., crank signal and cam signal) processing step (S20), a driver sync step (S21), a driver sync task performing step (S22), an application software (ASW) control factor (e.g., injection and ignition end angle $A_{end}$ and operation time Ti) calculation step (S23), a driver control factor (e.g., start angle $A_{drv}$) calculation and application software (ASW) control factor submodule transfer step (S24), and a submodule control factor (e.g., start angle $A_{sub}$) calculation and driver transfer step (S25).

As an example, the driver signal processing (S20) uses the crank signal and the cam signal among the information of the engine data input unit 5 for piston position calculation and determination in a cylinder of the engine 3. The driver sync (S21) corresponds to a piston position determination time in the cylinder. The driver sync task performing (S22) is performed as many times as the number of cylinders for one cycle of the engine 3 to follow the sync.

Referring to FIG. 2, a driver for the driver signal processing (S20), the driver sync (S21), and the driver sync task (S22) is an engine position management driver 21. The engine position management driver 21 is composed of a crank sensor signal processing unit 21a, a cam sensor signal processing unit 21b, an engine sync processing unit 21c, and an engine position calculation unit 21d.

Specifically, the crank sensor signal processing unit 21a uses tooth sensing information of a crank target wheel attached to a crankshaft. The cam sensor signal processing unit 21b uses edge sensing information of a cam target wheel attached to a camshaft. Through this, the position of the piston in the cylinder of the engine 3 is calculated and determined.

Specifically, the engine sync processing unit 21c determines the sync time by determining the sync (S21) using the position determination time of the piston in the cylinder of the engine 3 and performs the sync task after performing the sync by performing the sync task (S22) using the sync time. As an example, the sync task is performed as many times as the number of cylinders for one cycle of the engine 3. In case of the 4-cylinder engine 3, the sync task is performed four times during two revolutions of the engine by an engine cycle, and the angle conversion of the performing position is performed at points of 0°, 180°, 360°, and 540°. The engine position calculation unit 21d stores the tooth period in a buffer whenever each crank tooth passes. In this case, the tooth period corresponds to a time required for one crank tooth to be rotated. Further, the buffer may apply the timer module 40.

As an example, the application software (ASW) control factor calculation (S23) is performed in consideration of, and used as control factors, the respective injection and ignition end angles $A_{end}$ and the operation times Ti of the injector and the igniter.

Referring to FIG. 2, the application software (ASW) for the ASW control factor calculation (S23) corresponds to the injector application 23 and the igniter application 25. The injector application 23 is composed of an injection end angle calculation unit 23a and an injection time calculation unit 23b. The igniter application 25 is composed of an ignition end angle calculation unit 25a and an ignition time calculation unit 25b. Accordingly, the injector application 23 and the igniter application 25 consider the end angle $A_{end}$ and the operation time Ti as ASW calculation regions.

Specifically, the injection end angle calculation unit 23a calculates the fuel injection end angle at the sync task performing time of the engine position management driver 21 and transfers the calculated fuel injection end angle to the injector driver 27. The injection time calculation unit 23b calculates the fuel injection operation time during performing of the sync task and transfers the calculated fuel injection operation time to the injector driver 27. The ignition end angle calculation unit 25a calculates the ignition end angle during performing of the sync task and transfers the calculated ignition end angle to the igniter driver 29. The ignition time calculation unit 25b calculates the ignition operation time during performing of the sync task and transfers the calculated ignition operation time to the igniter driver 29.

As an example, the driver control factor calculation and transfer (S24) receives the end angle $A_{end}$ and the operation time Ti transferred from the injector application 23 and the igniter application 25 to calculate the start angle $A_{drv}$ that is the control factor and transfers the same to the submodule 30 at the same time. Further, the submodule control factor calculation and transfer step (S25) uses the end angle $A_{end}$ and the operation time Ti of the injector application 23 and the igniter application 25 to calculate the start angle $A_{sub}$ that is the control factor and transfers the calculated start angle $A_{sub}$ to the injector driver 27 and the igniter driver 29 at the same time. In this case, the unit of the end angle $A_{end}$ is degrees or °, and the unit of the operation time Ti is milliseconds or ms.

For this, N (integer that is equal to or larger than 3) tooth periods are called T1 to Tn, and a tooth period average $T_{mean}$ is defined as "$T_{mean}=(T1+T2+ \ldots +Tn)/n$". The operation time is determined by the number of teeth, and the number Ni of teeth corresponding to the operation time is defined as "$Ni=Ti/T_{mean}$". The operation time angle conversion value $Di°$ for the operation time is defined as "$Di°=Ni \times D°$", and $D°$ is set by hardware as an angle for one tooth and corresponds to about 6°. Through this, the driver start angle is calculated as "$A_{drv}=A_{end}-Di°$".

Referring to FIG. 2, drivers for the driver control factor calculation and transfer (S24) are the injector driver 27 and the igniter driver 29. The injector driver 27 is composed of an injection start angle calculation unit 27a, an injection start angle setting unit 27b, an injection time setting unit 27c, and an injection output unit 27d. The igniter driver 29 is composed of an ignition start angle calculation unit 29a, an ignition start angle setting unit 29b, an ignition time setting unit 29c, and an ignition output unit 29d. Accordingly, the injector driver 27 and the igniter driver 29 consider a plurality of tooth periods, the operation time, and the start angle $A_{drv}$ according to the conversion of the operation time into an angle as driver calculation regions.

Specifically, the injection start angle calculation unit 27a calculates the fuel injection start angle $A_{drv}$ with reference to the fuel injection end angle transferred from the injector application 23 at the sync task performing time of the engine position management driver 21. In this case, the start angle $A_{drv}$, is calculated by obtaining an average value of a plurality of tooth periods stored up to the corresponding time and read from the engine position management driver 21, converting the operation time into an angle using the average value, and subtracting the converted angle from the end angle of the injector application 23. The injection start angle setting unit 27b sets the injection start angle. The injection time setting unit 27c sets the injection time of the fuel injection with reference to the fuel injection operation time transferred from the injector application 23. The injection output unit 27d outputs the injection start angle and the injection time.

Specifically, the ignition start angle calculation unit 29a calculates the fuel ignition start angle of the ignition with reference to the ignition end angle of the fuel ignition transferred from the igniter application 25 at the sync task performing time of the engine position management driver 21. The ignition start angle setting unit 29b sets the ignition start angle of the ignition start angle calculation unit 29a. The ignition time setting unit 29c sets the fuel ignition operation time (i.e., ignition time) with reference to the fuel ignition operation time transferred from the igniter application 23. The ignition output unit 29d outputs the ignition start angle and the operation time.

Accordingly, the injector driver 27 (i.e., the injection start angle setting unit 27b and the injection time setting unit 27c) transfers the end angle and the operation time of the injector application to the submodule 30. Further, if the difference between the start angle $A_{sub}$ transferred from the submodule 30 and the self-calculated start angle $A_{drv}$ is within an error range as a result of comparison, the start angle value $A_{drv}$ of the submodule 30 is used. However, if the difference exceeds the error range, the start angle value $A_{drv}$ that is the self-calculated value of the injector driver 27 is set in the timer module 40, and the injection output is performed with respect to the signal output unit 50 to match the time. Further, the igniter driver 29 (i.e., the ignition start angle setting unit 29b and the ignition time setting unit 29c) transfers the ignition end angle and the ignition time of the igniter application 25 to the submodule 30. Further, the ignition output is performed to match the injection output time of the injector driver 27.

Referring to FIG. 2, the submodule 30 receives the end angle $A_{end}$ and the operation time Ti calculated by the application software (ASW) transferred from the driver, and converts the operation time Ti calculated by the application software (ASW) into the number of crank teeth to pass for the time with the tooth period value predicted by the current crank tooth with respect to the next crank tooth. The submodule 40 then converts the number of crank teeth converted from the operation time Ti into an angle through multiplication of the angle D° for one crank tooth, and calculates the injection and ignition start angle by subtracting the converted angle from the end angle $A_{end}$ calculated by the application software (ASW). In particular, the submodule 40 performs the calculation process for the start angle $A_{sub}$ up to a point of 18° corresponding to three crank teeth before the latest start angle calculated by the submodule 30. Accordingly, the submodule 30 considers the start angle $A_{sub}$ as the calculation region.

Figure 4:
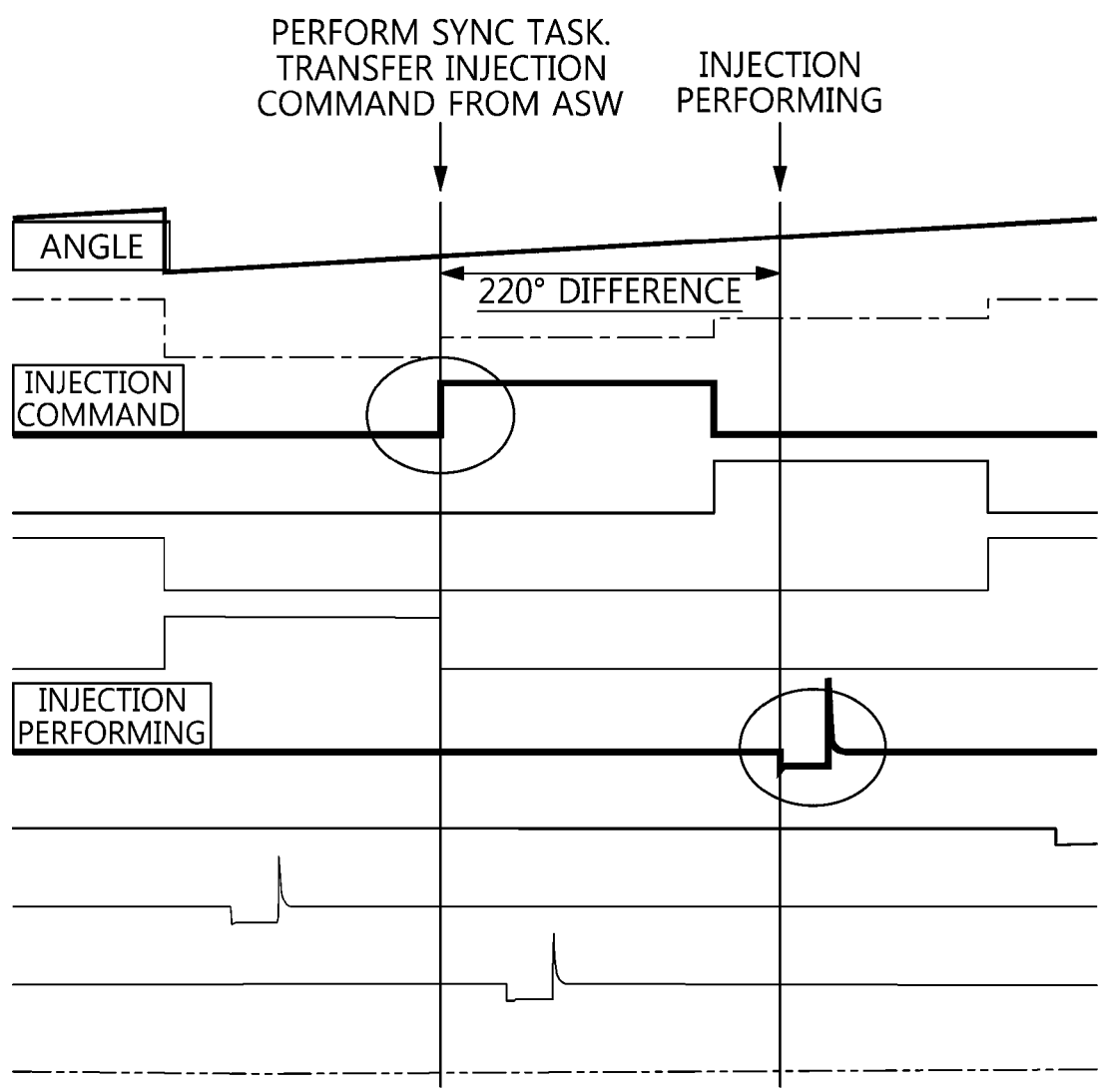
FIG. 4 is a diagram illustrating gap occurrence between a sync task performing time and an actual injection time that can be solved through calculated information failsafe control according to the present disclosure.

On the other hand, referring to FIG. 4, a gap is exemplified as existing at the sync task performing time of the engine position management driver 21 and the actual injection time of the injector driver 27. As exemplified in the drawing, the gap may have a gap range that goes away or nearly goes away on various engine conditions for driving the engine 3. Accordingly, it can be known that the start angle value $A_{drv}$ that was calculated much earlier than the actual injection performing time and that has a high probability of being inaccurate can be provided as a guideline for the failsafe of $A_{sub}$.

Figure 5:
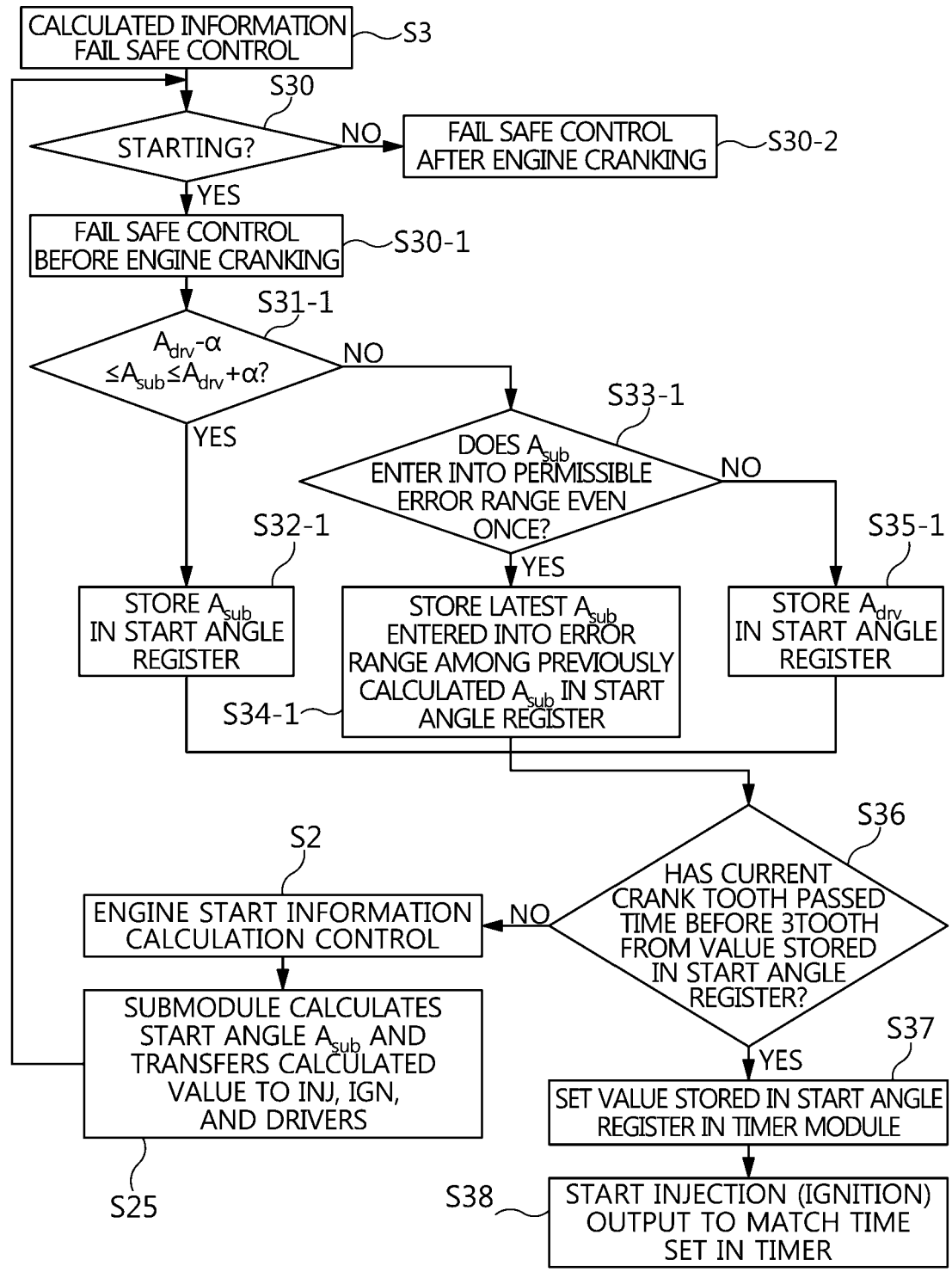
FIG. 5 is a flowchart illustrating calculated information failsafe control for engine start control applied during engine cranking according to the present disclosure.
Figure 6:
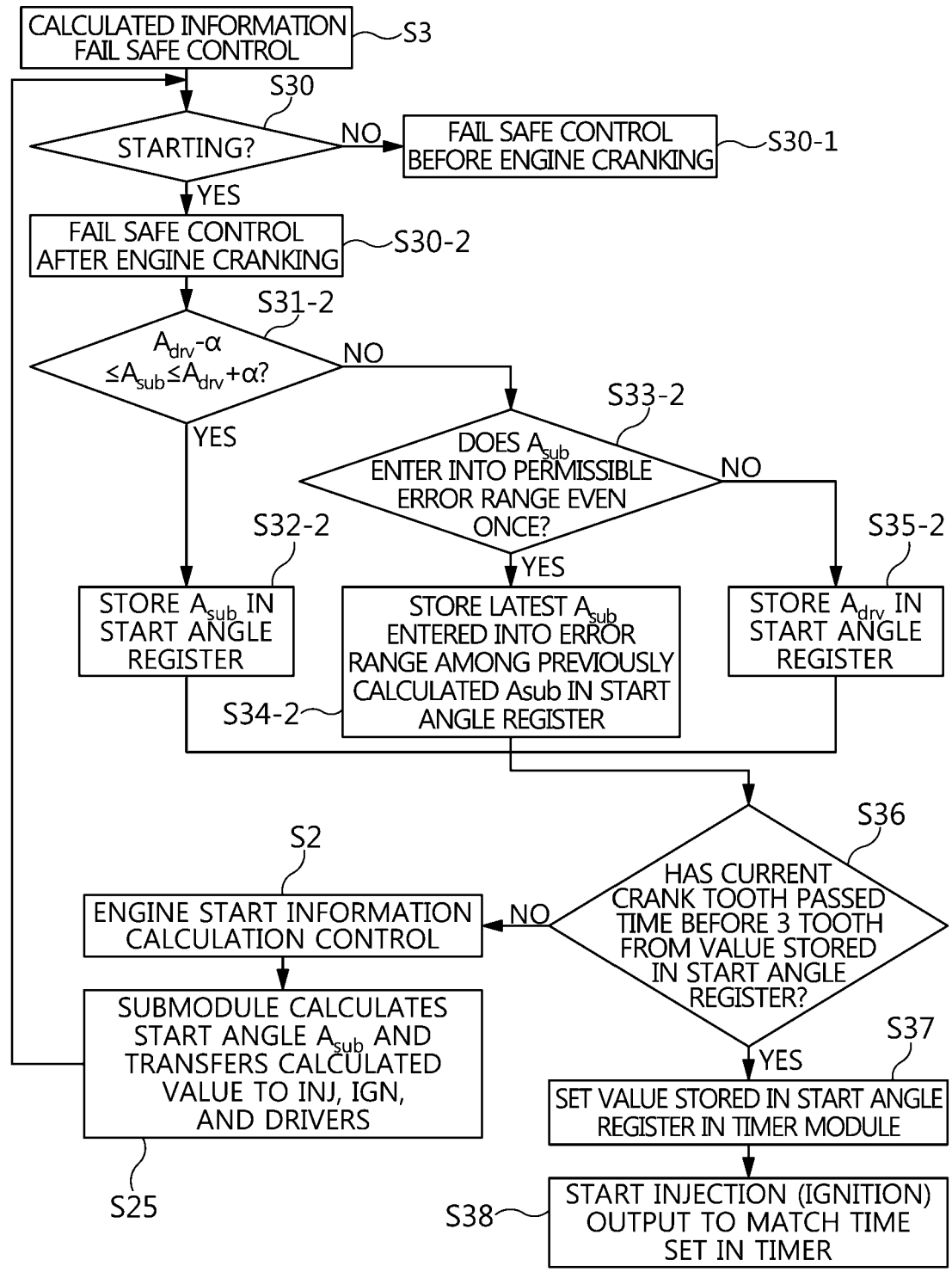
FIG. 6 is a flowchart illustrating calculated information failsafe control for engine start control applied after engine cranking according to the present disclosure.

Referring to FIGS. 5 and 6, the engine control unit 10 then divides the calculated information failsafe control (S3) into a failsafe control (S30-1) during engine cranking and a failsafe control (S30-2) after the engine cranking through the engine start confirming step (S30). Hereinafter, the failsafe control (S30-1) during engine cranking means a first failsafe control (S30-1), and the failsafe control (S30-2) after the engine cranking means a second failsafe control (S30-2).

Specifically, in the engine start confirming (S30), the engine control unit 10 refers to the crank signal and the revolutions per minute (RPM) among the information of the engine data input unit 5. In determining the failsafe control during the engine cranking as described above, the engine RPM change becomes large or increases during the engine cranking. The larger or increased RPM change causes the tooth period variation for one tooth to be become larger or increase in the process in which the injector driver 27 converts the operation time into an angle. Thus, the RPM change during engine cranking exerts an undue influence on the error range determination between the start angle $A_{drv}$ of the injector driver 27 and the start angle $A_{sub}$ of the submodule 30. Accordingly, the error range between the start angle $A_{drv}$ of the injector driver 27 and the start angle $A_{sub}$ of the submodule 30 differs depending on the engine cranking.

Through this, an error permission value α during cranking that is applied to the failsafe control (S30-1) during the engine cranking is set to be larger than an error permission value β after cranking that is applied to the failsafe control (S30-2) after the engine cranking. In this case, the error permission values α and β apply permission range values. The permission range values may be derived through repeated experiments with respect to respective engine operation situations or may have specific values according to the engine specification. Accordingly, the failsafe control (S30-1) during the engine cranking and the failsafe control (S30-2) after the engine cranking have a difference in error permission range between the injector driver 27 and the submodule 30.

Referring to FIG. 5, the engine control unit 10 performs the failsafe control (S30-1) during the engine cranking that includes a submodule current value verification step (S31-1), a submodule current value using step (S32-1), a submodule past value verification step (S33-1), a submodule past value using step (S34-1), a submodule replacement value using step (S35-1), a failsafe condition end step (S36), a final start angle setting step (S37), and a signal output step (S38).

As an example, the submodule current value verification step (S31-1) reads the start angle $A_{drv}$ of the injector driver 27 and the start angle $A_{sub}$ of the submodule 30, respectively, and applies such values to an error range determination equation during the cranking.

An error range determination equation during cranking can be as follows:

$$A_{drv} - \alpha \leq A_{sub} \leq A_{drv} + \alpha$$

Here, $A_{drv}$ is a start angle self-calculated by the injector driver 27, $A_{sub}$ is a start angle self-calculated by the submodule 30, and $\alpha$ is an error permission value during cranking. Further, + and − denote addition and subtraction, respectively, and ≤ is an inequality sign representing a size relationship between two values.

The submodule current value using step (S32-1) is applied where $A_{sub}$ is equal to or larger than a difference value between $A_{drv}$ and $\alpha$, and is equal to or smaller than a summed value of $A_{drv}$ and $\alpha$ from the error range determination equation during cranking. Through this, the submodule current value is stored in a register (e.g., start angle storage register) as the start angle $A_{sub}$ of the submodule 30.

As an example, the submodule past value verification step (S33-1) is performed where $A_{sub}$ is equal to or larger than the difference value between $A_{drv}$ and $\alpha$, and is not equal to or smaller than the summed value of $A_{drv}$ and $\alpha$ from the error range determination equation during cranking. Accordingly, the submodule past value verification step (S33-1) reads, as the submodule past value, a plurality of start angles $A_{sub}$ stored in the register (e.g., start angle storage register) as the past value of the submodule 30, and confirms the number of submodule past values that satisfy the error range determination equation during the cranking (S31-1).

The submodule past value using step (S34-1) is applied where there exists even one submodule past value that is equal to or larger than the difference value between $A_{drv}$ and $\alpha$, and is equal to or smaller than the summed value of $A_{drv}$ and $\alpha$. Through this, the submodule past value is stored in the register (e.g., start angle storage register) as the start angle $A_{sub}$ of the submodule 30. If there are a plurality of submodule past values that satisfy the error range determination equation, the latest submodule past value is selected.

In contrast, the submodule replacement value using step (S35-1) is applied where even one submodule past value that satisfies the error range determination equation does not exist. Through this, the start angle $A_{drv}$ self-calculated by the injector driver 27 is stored in the register (e.g., start angle storage register) in replacement of the start angle $A_{sub}$ of the submodule 30. As a result, excessive distortion of the fuel injection and ignition start angle can be prevented that may otherwise occur where the engine control unit 10 applies the miscalculated start angle $A_{sub}$ of the submodule 30.

As an example, the failsafe condition end step (S36) confirms a crank tooth position from the engine position management driver 21 and determines that the crank tooth of the current time corresponds to a time before a passage of three teeth from the value stored in the register (e.g., start angle storage register). Accordingly, if the time before three teeth does not pass, the failsafe condition end step (S36) returns to the submodule control factor calculation and transfer step (S25) of the engine start information calculation control (S2) and repeats the above-described process with the start angle $A_{sub}$ newly calculated by the submodule 30.

The final start angle setting step (S37) is applied where the current crank tooth confirmed from the engine position management driver 21 has passed the time before three teeth from the value stored in the register (e.g., start angle storage register). Through this, the timer module 40 (see FIG. 2) sets the timing in which the start angle is stored in the register (e.g., start angle storage register). In this case, the timer start angle means the start angle $A_{sub}$ of the submodule current value (S32-1), the start angle $A_{sub}$ of the submodule past value (S34-1), or the start angle $A_{drv}$ of the injector driver 27 (S35-1).

In the signal output step (S38), the injector driver 27 and the igniter driver 29 (see FIG. 2) start injection and ignition outputs to match the timing set in the timer module 40 (see FIG. 2).

The signal output unit 50 (see FIG. 2) then supplies the injection and ignition output signals of the injector driver 27 and the igniter driver 29 (see FIG. 2) as outputs of the injector and the igniter. As a result, the signal output is switched to the fuel injection and ignition control (S4) (see FIG. 1) to operate the engine 3.

Referring to FIG. 6, the engine control unit 10 performs the failsafe control (S30-2) after the engine cranking that includes a submodule current value verification step (S31-2), a submodule current value using step (S32-2), a submodule past value verification step (S33-2), a submodule past value using step (S34-2), a submodule replacement value using step (S35-2), a failsafe condition end step (S36), a final start angle setting step (S37), and a signal output step (S38).

As an example, the submodule current value verification step (S31-2) reads the start angle $A_{drv}$ of the injector driver 27 and the start angle $A_{sub}$ of the submodule 30, respectively, and applies such values to an error range determination equation after the cranking.

An error range determination equation after cranking can be as follows:

$$A_{drv} - \beta \leq A_{sub} \leq A_{drv} \pm \beta$$

Here, $A_{drv}$ is a start angle self-calculated by the injector driver 27, $A_{sub}$ is a start angle self-calculated by the submodule 30, and $\beta$ is an error permission value after cranking. Further, + and − denote addition and subtraction, respectively, and is an inequality sign representing a size relationship between two values.

The submodule current value using step (S32-2) is applied where $A_{sub}$ is equal to or larger than a difference value between $A_{drv}$ and $\beta$, and is equal to or smaller than a summed value of $A_{drv}$ and $\beta$ from the error range determination equation after cranking. Through this, the submodule current value is stored in a register (e.g., start angle storage register) as the start angle $A_{sub}$ of the submodule 30.

As an example, the submodule past value verification step (S33-2) is performed where $A_{sub}$ is equal to or larger than the difference value between $A_{drv}$ and $\alpha$, and is not equal to or smaller than the summed value of $A_{drv}$ and $\alpha$ from the error range determination equation after cranking. Accordingly, the submodule past value verification step (S33-2) reads, as the submodule past value, a plurality of start angles $A_{sub}$ stored in the register (e.g., start angle storage register) as the past value of the submodule 30, and confirms the number of submodule past values that satisfy the error range determination equation after the cranking (S31-2).

The submodule past value using step (S34-2) is applied where there exists even one submodule past value that is equal to or larger than the difference value between $A_{drv}$ and $\beta$, and is equal to or smaller than the summed value of $A_{drv}$ and $\beta$. Through this, the submodule past value is stored in the register (e.g., start angle storage register) as the start angle $A_{sub}$ of the submodule 30. If there are a plurality of submodule past values that satisfy the error range determination equation, the latest submodule past value is selected.

In contrast, the submodule replacement value using step (S35-2) is applied where even one submodule past value that satisfies the error range determination equation does not exist. Through this, the start angle $A_{drv}$ self-calculated by the injector driver 27 is stored in the register (e.g., start angle storage register) in replacement of the start angle $A_{sub}$ of the submodule 30. As a result, excessive distortion of the fuel injection and ignition start angle can be prevented that may otherwise occur where the engine control unit 10 applies the miscalculated start angle $A_{sub}$ of the submodule 30.

As an example, the failsafe condition end step (S36) confirms a crank tooth position from the engine position management driver 21 and determines that the crank tooth of the current time corresponds to a time before a passage of three teeth from the value stored in the register (e.g., start angle storage register). Accordingly, if the time before three teeth does not pass, the failsafe condition end step (S36) returns to the submodule control factor calculation and transfer step (S25) of the engine start information calculation control (S2) and repeats the above-described process with the start angle $A_{sub}$ newly calculated by the submodule 30.

The final start angle setting step (S37) is applied where the current crank tooth confirmed from the engine position management driver 21 has passed the time before three teeth from the value stored in the register (e.g., start angle storage register). Through this, the timer module 40 (see FIG. 2) sets the timing in which the start angle is stored in the register (e.g., start angle storage register). In this case, the timer start angle means the start angle $A_{sub}$ of the submodule current value (S32-2), the start angle $A_{sub}$ of the submodule past value (S34-2), or the start angle $A_{drv}$ of the injector driver 27 (S35-2).

In the signal output step (S38), the injector driver 27 and the igniter driver 29 (see FIG. 2) start injection and ignition outputs to match the timing set in the timer module 40 (see FIG. 2).

On the other hand, referring to FIG. 2, the signal output unit 50 supplies the injection and ignition output signals of the injector driver 27 and the igniter driver 29 as outputs of the injector and the igniter. As a result, the signal output is switched to the fuel injection and ignition control (S4) of FIG. 1 to operate the engine 3.

As described above, in the method for strengthening reliability of the fuel injection and ignition time of the engine system according to the embodiment, the engine control unit 10 includes the engine position management driver 21, the injector application 23, the igniter application 25, the injector driver 27, the igniter driver 29, and the submodule 30. If the engine control unit 10 is switched to the on state together with the key-on of the engine, the start angle of the fuel injection and ignition start time of the engine 3 is calculated as the driver start angle $A_{drv}$ by the injector driver 27 and the submodule start angle $A_{sub}$ by the submodule 30. Also, the start angle for the fuel injection and ignition start time is set through verification of the miscalculation of the submodule start angle $A_{sub}$ with the error permission values divided by cranking. As a result, the method for strengthening reliability of the fuel injection and ignition time can reduce the unintended engine operability due to the excessive distortion of the start time of the fuel injection and ignition that may otherwise cause the miscalculation of the submodule 30. The method does so by applying the driver start angle $A_{drv}$ of the injector driver 27 through the failsafe for the submodule start angle $A_{sub}$ of the submodule 30. The method can perform the optimum engine control by observing the intended fuel injection and ignition end time and operation time.

While the present disclosure has been described with respect to the specific embodiments, it will be apparent to those having ordinary skill in the art that various changes and modifications may be made without departing from the spirit and scope of the disclosure as defined in the following claims.

What is claimed is:

1. A method for engine start control based on a failsafe logic, the method comprising:
performing, by an engine control unit, calculated information failsafe control for performing miscalculation verification for a submodule start angle of a submodule using a start angle for fuel injection and ignition of an engine as a driver start angle of an injector driver;
dividing, by the engine control unit, the calculated information failsafe control into a first failsafe control step of an injector driver during cranking of the engine and a second failsafe control step of the injector driver after the cranking of the engine, the first failsafe control step applying a first error permission value of the submodule and the second failsafe control step applying a second error permission value of the submodule;
performing the miscalculation verification with the first error permission value;
completing the miscalculation verification through a crank tooth position passage determined at a time before a passage of three teeth;
setting and storing, in a register, a start angle for a fuel injection and ignition start time;
performing an operation of the register in the fuel injection and ignition timing;
dividing the second failsafe control into confirming a second error permission range of the second error permission value; and
setting any one of the submodule start angle and the driver start angle as the start angle for the fuel injection and ignition start time,
wherein the first error permission value of the submodule start angle and the second error permission value of the submodule start angle are obtained by dividing an error permission value through the cranking of the engine;
wherein confirmation of a first error permission range is performed where the submodule start angle is determined to be between a difference value obtained by subtracting the first error permission value of the first failsafe control step from the driver start angle and a summed value obtained by adding the first error permission value of the first failsafe control step to the driver start angle, and
wherein confirmation of the second error permission range is performed where the submodule start angle is determined to be between a difference value obtained by subtracting the second error permission value of the second failsafe control step from the driver start angle and a summed value obtained by adding the second error permission value of the second failsafe control step to the driver start angle.

2. The method according to claim 1, wherein the first failsafe control step is divided into confirming the first error permission range for the submodule start angle by applying the first error permission value of the first failsafe control step to the driver start angle, and setting any one of the submodule start angle and the driver start angle as the start angle for the fuel injection and ignition start time.

3. The method according to claim 1, wherein, in the first failsafe control step, the driver start angle is applied where the first error permission range is applied, a past submodule start angle that is a previous value of the submodule start angle is applied, and the past submodule start angle does not satisfy the first error permission range.

4. The method according to claim 3, wherein, as the past submodule start angle, a latest value is selected from among a plurality of past submodule start angles that satisfy the first error permission range.

5. The method according to claim 1, wherein, in the second failsafe control step, the driver start angle is applied where the second error permission range is applied, a past submodule start angle that is a previous value of the submodule start angle is applied, and the past submodule start angle does not satisfy the second error permission range.

6. The method according to claim 5, wherein, as the past submodule start angle, a latest value is selected from among a plurality of past submodule start angles that satisfy the second error permission range.

7. The method according to claim 1, further comprising:
performing, by the engine control unit, an engine start information calculation control,
wherein the engine start information calculation control comprises:
performing, by the engine control unit, driver sync confirmation using a crank signal and a cam signal of the engine;
calculating an application software (ASW) end angle and an ASW operation time at a time of performing the driver sync confirmation; and
calculating and confirming the driver start angle and the submodule start angle through the ASW end angle and the ASW operation time.

8. The method according to claim 7, wherein the crank signal is tooth sensing information of a crank target wheel attached to a crankshaft, and wherein the cam signal is edge sensing information of a cam target wheel attached to a cam shaft.

* * * * *